Figure 1:
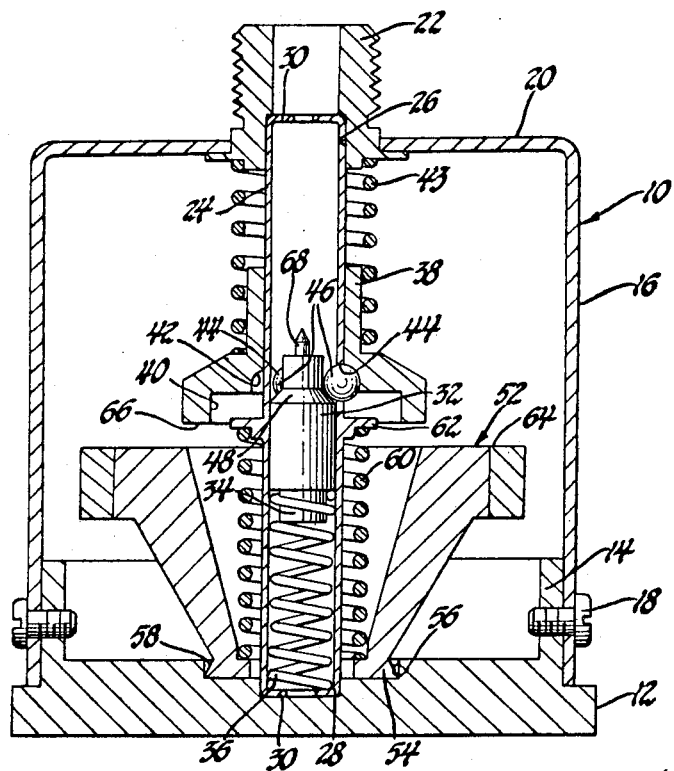

United States Patent

Daffron

[15] 3,693,461
[45] Sept. 26, 1972

[54] MULTIDIRECTIONAL SENSOR

[72] Inventor: William G. Daffron, Santa Barbara, Calif.

[73] Assignee: General Motors Corporation, Detroit, Mich.

[22] Filed: May 6, 1970

[21] Appl. No.: 34,980

[52] U.S. Cl. .................................................. 73/514
[51] Int. Cl. ............................................. G01p 15/02
[58] Field of Search ............... 73/514, 515, 492, 503; 116/114 AH; 200/61.45; 74/2

[56] References Cited

UNITED STATES PATENTS 3,078,722  2/1963  Kongelbeck ................. 73/503

*Primary Examiner*—James J. Gill
*Attorney*—W. E. Finken and Herbert Furman

[57] ABSTRACT

A multidirectional sensor having an operator slidably mounted within a guide tube and resiliently biased toward actuated position. A plurality of balls are located within apertures in the tube and engage opposed radial shoulders of the operator and of an escapement to retain the operator against movement. The escapement is slidably mounted on the tube and resiliently biased into engagement with the balls to locate the escapement in a predetermined position. The resilient bias on the escapement is opposite that exerted on the operator. A seismic mass is seated on a support and surrounds the guide tube. The mass is resiliently located in a predetermined position wherein its longitudinal axis is coaxial to or aligned with the axis of the operator and guide tube. An acceleration pulse of predetermined amplitude and time moves the seismic mass to a position where its axis is out of alignment with that of the operator and tube and the mass engages the escapement to move the escapement axially of the guide tube and permit the balls to move radially out of engagement with the opposed radial shoulders to release the operator.

9 Claims, 2 Drawing Figures

PATENTED SEP 26 1972

3,693,461

MULTIDIRECTIONAL SENSOR

This invention relates to multidirectional sensors and more particularly to multidirectional sensors for measuring acceleration pulses and releasing an operator for movement to actuated position when a pulse of predetermined amplitude and time occurs.

Generally the sensor of this invention includes an operator which is resiliently biased toward an actuated position and is held against such movement by the engagement of a plurality of balls with opposed radial shoulders of the operator and of an escapement. The escapement is resiliently biased opposite the operator. A generally frusto-conically shaped seismic mass is seated on a support and is normally coaxial with the operator and guide tube. The mass moves out of such coaxial relationship or tilts, when subjected to an acceleration pulse of predetermined amplitude and time, and engages the escapement to move it axially against its bias to release the balls and thereby release the operator.

One feature of the sensor of this invention is that an operator is resiliently biased in an axial direction and held against axial movement to actuated position by the engagement of a plurality of balls with generally opposed radial shoulders on the operator and on an escapement which is resiliently biased in an axial direction opposite that of the operator. Another feature of the sensor of this invention is that a seismic mass is engageable with the escapement upon the occurrence of an acceleration pulse of predetermined amplitude and time to move the escapement against its bias and release the balls and the operator.

Figure 2:
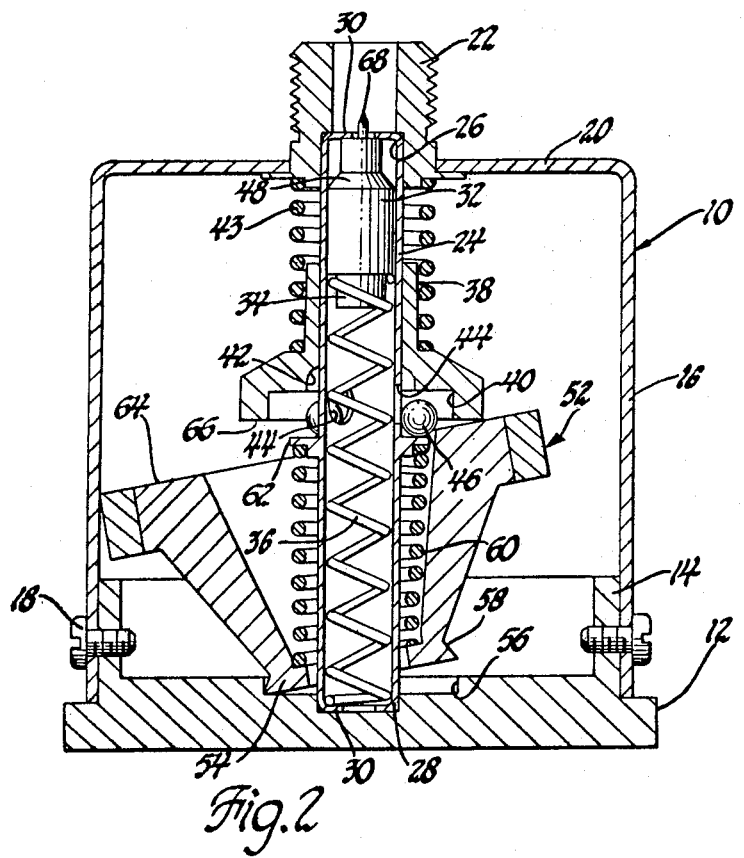

These and other features of the sensor of this invention will be readily apparent from the following specification and drawings wherein:

FIG. 1 is a view of the sensor in normal position; and
FIG. 2 is a view of the sensor in actuated position.

Referring now to FIG. 1, the sensor 10 generally includes a circular base plate 12 having an axially extending flange 14. A cylindrical housing 16 seats against the flange 14 and also the plate 12 and is bolted at 18 to the former. The upper end wall 20 of housing 16 is apertured and receives a flanged threaded bushing 22 therethrough. The flange of the bushing is suitably secured to wall 20.

A cylindrical guide member or guide tube 24 extends between a counterbore 26 of the bushing 22 and a bore 28 of base plate 12. The opposite end walls 30 of the guide tube are centrally apertured. A cylindrical operator 32 is slidably mounted within the guide tube. The operator includes an extension 34 on one end thereof. A coil compression spring 36 seats on the operator adjacent the extension and also on the lower end wall 30 of the guide tube to continuously bias the operator 32 axially of the guide tube or upwardly as viewed in the drawings. An annular flanged escapement 38 slidably surrounds the exterior of the guide tube 22. The flange of the escapement includes a counterbore 40 having a counterbore opening thereto and providing a radial shoulder 42 on the escapement. A coil compression spring 43 seats on the flange of the bushing 22 and on the flange of the escapement 38 to bias the escapement downwardly as viewed in FIGS. 1 and 2 or opposite to the bias of the spring 36 on the operator 32. The guide tube 24 includes three equally circumferentially spaced radial apertures 44 in the wall thereof, and a ball 46 is normally freely received within each aperture. The engagement of the balls 46 with the radial shoulder 42 and with a tapered generally radially and axially extending annular shoulder 48 of the operator 32 under the resilient opposing biases of springs 36 and 43 locates the operator 32 in its normal or unactuated position shown in FIG. 1.

A seismic mass 52 of generally frusto-conical shape includes a lower apertured planar end wall 54 which receives the guide tube 24 and seats on the base wall of a counterbore 56 of the base plate 12. The mass is coaxial with the guide tube and operator in its normal unactuated position shown in FIG. 1. The side wall of the counterbore 56 extends generally axially while the juxtaposed outer annular wall 58 of the mass is tapered or extends axially inwardly to permit the mass 52 to tilt relative to the base wall of the counterbore 56 as shown in FIG. 2 and as will be hereinafter described in detail. A coil compression spring 60 seats between an annular flange 62 of the guide tube 24 and the wall 54 of the seismic mass to normally seat wall 54 against the base wall of the counterbore 56 in coplanar relationship.

The force of spring 60 and the weight of the seismic mass 52 are predetermined and are set so that the seismic mass will not tilt to a predetermined included angle with respect to the base wall of counterbore 56 unless the mass is subjected to an acceleration pulse of predetermined amplitude and time.

When the mass is subjected to an acceleration pulse of predetermined amplitude and time, it will move or tilt relive to the base wall of counterbore 56 to its position shown in FIG. 2. As the seismic mass tilts from its FIG. 1 position to its FIG. 2 position, the upper wall 64 of the mass engages the juxtaposed generally parallel lower wall 66 of the escapement 38, as shown in FIG. 2, to move the escapement 38 axially of the guide tube 24 and the operator 32 against the action of spring 43. This moves shoulder 42 axially of and out of engagement with balls 46. The tapered shoulder 48 of the operator, under the action of spring 36, will then cam the balls 46 outwardly of the apertures 44 as shown in FIG. 2, to thereby release the operator 32 for movement to actuated position wherein it engages the upper end wall 30 of the guide tube. In such position as shown in FIG. 2, the firing pin 68 of the operator projects outwardly of the apertured end wall 30 of the guide tube and can either close a switch, fire a detonator, or perform other functions.

The sensor 10 of this invention is particularly intended for use with an air cushion restraint system of a vehicle. In such system a pressure vessel sealed by a rupturable diaphragm is connected to a manifold which in turn communicates with the cushion or bag. The diaphragm may be directly ruptured by the firing pin 68 or indirectly ruptured by the firing pin through a squib or detonator fired thereby. The firing pin 68 of the sensor 10 can be arranged also to close a switch and electrically fire a squib. The squib may either directly rupture the diaphragm or be located within the vessel in order to fire explosive powder to augment the pressure fluid and thereby rupture the diaphragm.

Upon release of the balls 46, the spring 43 immediately moves the escapement into engagement with the mass 52 and returns the mass to its position shown in FIG. 1.

If the mass is subjected to acceleration pulses below the predetermined amplitude and time, the mass 52 may still tilt relative to the base wall of counterbore 56 but will not move through an included angle sufficiently great to engage wall 64 with wall 66 and in turn release the balls 46.

Thus, this invention provides an improved sensor.

I claim:

1. A sensor comprising, a support including an axial guide, an operator slidably mounted on the guide for axial movement therealong, means resiliently biasing the operator in one axial direction relative to the guide, escapement means slidably mounted on the guide for axial movement therealong, means resiliently biasing the escapement means relative to the guide in an axial direction opposite the one axial direction, detent means engageable with the operator and with the escapement means under the opposing biases to axially locate the operator and the escapement means relative to the guide, a seismic mass, means mounting the seismic mass on the support for movement between a normal position and an actuated position, means exerting a predetermined force on the mass maintaining the mass in normal position and resisting movement thereof to actuated position, an acceleration pulse of predetermined amplitude and time overcoming the predetermined force means and moving the seismic mass to actuated position, and means on the mass engageable in actuated position with the escapement means for moving the escapement means in the one axial direction against the escapement means bias to release the detent means and permit movement of the operator in the one axial direction.

2. A sensor comprising, a support including an axial guide, an operator slidably mounted on the guide for axial movement therealong, means resiliently biasing the operator in one axial direction relative to the guide, escapement means slidably mounted on the guide for axial movement therealong, means resiliently biasing the escapement means relative to the guide in an axial direction opposite the one axial direction, detent means, means on the guide locating the detent means against axial movement and permitting radial movement thereof, the detent means being radially engageable with the operator and with the escapement means under the opposing biases to axially locate the operator and the escapement means relative to the guide, a seismic mass, means mounting the seismic mass on the support for movement between a normal position and an actuated position, means exerting a predetermined force on the mass maintaining the mass in normal position and resisting movement thereof to actuated position, an acceleration pulse of predetermined amplitude and time overcoming the predetermined force means and moving the seismic mass to actuated position, and means on the mass engageable in actuated position with the escapement means for moving the escapement means in the one axial direction against the escapement means bias to permit movement of the detent means radially out of engagement with the operator and permit movement of the operator in one axial direction.

3. A sensor comprising, a support including an axial guide, an operator slidably mounted on the guide for axial movement therealong, means resiliently biasing the operator in one axial direction relative to the guide, escapement means slidably mounted on the guide for axial movement therealong, means resiliently biasing the escapement means relative to the guide in an axial direction opposite the one axial direction, a plurality of balls, means on the guide locating the balls against axial movement and permitting radial movement thereof, the balls being radially engageable with the operator and with the escapement means under the opposing biases to axially locate the operator and the escapement means relative to the guide, a seismic mass, means mounting the seismic mass on the support for movement between a normal position and an actuated position, means exerting a predetermined force on the mass maintaining the mass in normal position and resisting movement thereof to actuated position, an acceleration pulse of predetermined amplitude and time overcoming the predetermined force means and moving the seismic mass to actuated position, and means on the mass engageable in actuated position with the escapement means for moving the escapement means in the one axial direction against the escapement means bias to permit the balls to move radially out of engagement with the operator and permit movement of the operator in the one axial direction.

4. A sensor comprising, a support including a hollow tubular axial guide, an operator slidably mounted within the guide and including radial shoulder means, means resiliently biasing the operator in one axial direction relative to the guide, an escapement member slidably mounted on the exterior of the guide and including radial shoulder means, means resiliently biasing the escapement member relative to the guide in an axial direction opposite the one axial direction, a plurality of balls, means on the guide locating the balls axially of the guide, the balls being radially engageable with the operator shoulder means and escapement shoulder means under the opposing biases to locate the operator and the escapement relative to the guide, a seismic mass symmetrical about an axis, means mounting the seismic mass on the support for movement between a normal position wherein the axis of symmetry of the mass is coaxial with the axis of movement of the operator and an actuated position wherein the axis of symmetry of the mass is located at a predetermined included angle to the axis of movement of the operator, means exerting a predetermined force on the mass maintaining the mass in normal position and resisting movement thereof to actuated position, an acceleration pulse of predetermined amplitude and time overcoming the predetermined force means and moving the seismic mass to actuated position, and means on the mass engageable in actuated position with the escapement member for moving the escapement member in the one axial direction against the escapement member bias to permit the balls to move radially out of engagement with the operator and permit movement of the operator in the one axial direction.

5. A sensor comprising, a support including a hollow tubular axial guide, an operator slidably mounted within the guide and including an annular axially tapered radial shoulder, means resiliently biasing the operator in one axial direction relative to the guide, an annular escapement member slidably mounted exteriorly of the guide and including an annular radial extending shoulder, means resiliently biasing the escapement member relative to the guide in an axial direction opposite the one axial direction, a plurality of balls, means locating the balls axially of the guide, the balls being radially engageable with the operator shoulder and escapement shoulder under the opposing biases to locate the operator and the escapement member relative to the guide, a hollow frusto-conical seismic mass surrounding the guide, means seating the seismic mass on the support for movement between a normal position wherein the axis of symmetry of the mass is coaxial with the axis of movement of the operator and an actuated position wherein the axis of symmetry of the mass is located at a predetermined included angle to the axis of movement of the operator, means exerting a predetermined force on the mass maintaining the mass in normal position and resisting movement thereof to actuated position, an acceleration pulse of predetermined amplitude and time overcoming the predetermined force means and moving the seismic mass to actuated position, and means on the mass engageable with the escapement member for moving the escapement member in the one axial direction against the escapement member bias to permit the axially tapered radial shoulder of the operator to cam the balls out of engagement therewith and permit movement of the operator in the one axial direction.

6. A sensor as recited in claim 1 wherein the axis of the mass is coaxial with the one axial direction when the mass is in normal position and is angular with respect to such axial direction when the mass is in actuated position.

7. The combination recited in claim 5 wherein the apical end of the seismic mass is seated on the support and the basal end of the seismic mass is engageable with the escapement member upon movement of the mass to actuated position.

8. The combination recited in claim 1 wherein the seismic mass is of generally frusto-conical shape, the mounting means including means on the support seating one end of the mass thereon for movement between normal and actuated positions, the means on the mass being located at the other end thereof for engagement with the escapement means.

9. The combination recited in claim 8 wherein the apical end of the mass is seated on the support and the basal end thereof is engageable with the escapement means.

* * * * *